(12) United States Patent
Stanek

(10) Patent No.: US 6,909,808 B2
(45) Date of Patent: Jun. 21, 2005

(54) IMAGE COMPRESSION TO ENHANCE OPTICAL CORRELATION

(75) Inventor: Clay J. Stanek, Poway, CA (US)

(73) Assignee: Anzus, Inc., San Diego, CA (US)

(*) Notice: Subject to any disclaimer, the term of this patent is extended or adjusted under 35 U.S.C. 154(b) by 648 days.

(21) Appl. No.: 10/093,437

(22) Filed: Mar. 8, 2002

(65) Prior Publication Data

US 2003/0169928 A1 Sep. 11, 2003

(51) Int. Cl.[7] .................................................. G06K 9/36
(52) U.S. Cl. ....................................................... 382/232
(58) Field of Search ................................. 382/232, 240, 382/243; 250/363.06; 378/2; 359/237; 708/816; 341/13, 111, 137

(56) References Cited

U.S. PATENT DOCUMENTS

| | | | |
|---|---|---|---|
| 3,748,470 A | * | 7/1973 | Barrett ........................... 378/2 |
| 3,860,821 A | * | 1/1975 | Barrett ................... 250/363.01 |
| 4,832,447 A | | 5/1989 | Javidi |
| 5,111,515 A | | 5/1992 | Javidi |
| 5,119,443 A | | 6/1992 | Javidi et al. |
| 5,276,636 A | * | 1/1994 | Cohn ........................... 708/816 |
| 5,367,579 A | | 11/1994 | Javidi et al. |
| 5,485,312 A | | 1/1996 | Horner et al. |
| 5,600,373 A | | 2/1997 | Chui et al. |
| 5,699,449 A | | 12/1997 | Javidi |
| 5,794,173 A | | 8/1998 | Schutte |
| 5,841,907 A | | 11/1998 | Javidi et al. |
| 5,903,648 A | | 5/1999 | Javidi |
| 5,946,414 A | * | 8/1999 | Cass et al. ................... 382/183 |
| 6,002,773 A | | 12/1999 | Javidi |
| 6,021,378 A | | 2/2000 | Reiter et al. |
| 6,104,336 A | | 8/2000 | Curran et al. |
| 6,104,345 A | | 8/2000 | Tweg et al. |
| 6,202,033 B1 | | 3/2001 | Lange |
| 6,225,942 B1 | | 5/2001 | Alon |
| 6,233,357 B1 | | 5/2001 | Li et al. |
| 6,282,496 B1 | | 8/2001 | Chowdhary |
| 6,289,132 B1 | | 9/2001 | Goertzen |
| 6,317,688 B1 | | 11/2001 | Bruckner et al. |
| 6,332,030 B1 | | 12/2001 | Manjunath et al. |
| 6,343,155 B1 | | 1/2002 | Chui et al. |
| 6,674,911 B1 | * | 1/2004 | Pearlman et al. ........... 382/240 |

OTHER PUBLICATIONS

Tien–Hsin Chao & Hua–Kuang Liu, Real–time Optical Holographic Tracking of Multiple Objects, Applied Optics, vol. 28, No. 2, Jan. 15, 1989, pp. 226–231.

Eugene Hecht, Adelphi University, Optics, Third Edition, pp. 437–438, 442, 532, 456, 457, 602–604, Addison Wesley.

Kenneth H. Fielding, Joseph L. Horner, Charles K. Makekau, Optical Fingerprint Identification by Binary Joint Transformation, Optical Engineering, vol. 30, No. 12, Dec. 1991, pp. 1958–1961.

(Continued)

*Primary Examiner*—Jose L. Couso
(74) *Attorney, Agent, or Firm*—Blakely Sokoloff Taylor & Zafman, LLP

(57) ABSTRACT

The present invention is in the area of optical correlation. Embodiments of the invention encompass systems of process and/or equipment to compress images for optical correlation. Further embodiments of the invention may compress images to correlate objects and gridlock sensors with images based upon track data from sensors. In many of the embodiments of the invention, the sensors may comprise radars, global positioning systems, laser target designators, seismic sensors or systems of seismic sensors comprising hydrophones and geophones, and other similar systems. While some embodiments of the invention may comprise an optical correlator, many embodiments of the invention perform one or more analyses statistically. In addition, many embodiments of the invention comprise software that can execute on a laptop, desktop, or similar computer.

30 Claims, 7 Drawing Sheets

OTHER PUBLICATIONS

Subhasis Saha, Image Compression—from DCT to Wavelets: A Review, ACM Crossroads Student Magazine, http://www.acm.org/crossroads/xrds6–3/sahaimgcoding.html., pp. 1–14.

H. John Caulfield, Templates for Invention in the Mathematical and Physical Sciences with Applications to Optics, Proceedings of SPIE vol. 4392, 2001, pp. 104–117, SPIE.

Eddy C. Tam, Francis T. S. Yu, Don A. Gregory, Richard D. Juday, Autonomous Real–Time Object Tracking with an Adaptive Joint Transform Correlator, Optical Engineering, vol. 29, No. 4, Apr. 1990, pp. 314–320.

Yu Hen Hu, University of Wisconsin, Madison, Visual Artifact Reduction by Post–Processing, Presented and Carnegie Mellon University, Dept. ECE, Nov. 1, 2001, p. 69.

Shahriar Mirabbasi, On the Design of Multirate Filter Banks by H—Optimization, Master of Applied Science, 1997, Dept. of Electrical & Computer Engineering, University of Toronto, p. 37.

C. S. Weaver & J. W. Goodman, A Technique for Optically Convolving Two Functions, Applied Optics, vol. 5, No. 7, Jul. 1996, pp. 1248, 1249.

Ali. M. Reza, Wavelet Characteristics, Spire Lab, UWM, Oct. 19, 1999 White Paper, pp. 1–9.

http://www.diffuse.org/compress.html, Diffuse Guide to Image Compression, pp. 1–8.

Edward H. Adelson, Subband Coring for Image Noise Reduction, Internal Report, RCA David Sarnoff Research Center, Nov. 26, 1986, p. 14.

Julien Reichel, Gloria Menegaz, Marcus J. Nadenau & Murat Kunt, Integer Wavelet Transform for Embedded Lossy to Lossless Image Compression, Signal Processing Laboratory, Swiss Federal Institute of Technology, Lausanne, Switzerland, pp. 1–9.

Shuo–Yen Choo & Gregory Chew, EE362—JPEG 2000 and Wavelet Compression, http://www–ise.stanford.edu/class/psych221/00/shuoyen, pp. 1–23.

Cardinal Warde & Arthur D. Fisher, Spatial Light Modulators: Applications and Functional Capabilities, Optical Signal Processing, Copyright 1987 by Academic Press, Inc., pp. 477–523.

Martin Vetterli & Jelena Kovacevic, "Wavelets and Subband Coding," Wavelets, Filter Banks and Multiresolution Signal Processing, 1995, pp. 1–13, Prentice Hall.

Bahram Javidi & Chung–Jung Kuo, Joint Transform Image Correlation Using a Binary Spatial Light Modulator at the Fourier Plane, Applied Optics, vol. 27, No. 4, Feb. 15, 1988, pp. 663–665.

Henri Rajbenbach, Dynamic Holography in Optical Pattern Recognition, SPIE vol. 2237, Optical Pattern Recognition V (1994), pp. 329–346, SPIE.

Bahram Javidi, Processing for Encryption and Security Systems, Optics & Photonics News, Mar. 1997, pp. 29–33.

Bahram Javidi & Joseph L. Horner, Single Spatial Light Modulator Joint Transform Correlator, Applied Optics, vol. 28, No. 5, Mar. 1, 1989, pp. 1027–1032.

Bahram Javidi, Nonlinear Joint Power Spectrum Based Optical Correlation, Applied Optics, vol. 28, No. 12, Jun. 15, 1989, pp. 2358–2367.

Bahram Javidi, Jun Wang & Qing Tang, Nonlinear Joint Transform Correlators, Pattern Recognition, vol. 27, No. 4, Copyright 1994 Pattern Recognition Society, Printed in Great Britian, pp. 523–542.

* cited by examiner

FIG. 3D

IMAGE COMPRESSION TO ENHANCE OPTICAL CORRELATION

FIELD OF INVENTION

The present invention is in the field of optical correlation. More particularly, the present invention provides a method, apparatus, system, and machine-readable medium to enhance image correlation with image compression.

BACKGROUND

Optical correlators determine the Fourier transform and inverse Fourier transform of complex images quickly with respect to counterpart statistical methods. Potential applications for optical correlators take advantage of the speed of the transformations by introducing a cross-correlation process. Displaying two images at the input plane introduces the cross-correlation process and the cross-correlation of images provides a measure of the similarity that allows images with similar features to be identified quickly. For example, joint-transform optical correlators perform comparisons of a reference fingerprint of a person against a database of fingerprints that contains the fingerprint as well as an identification of the person. A guide placed over a prism positions a finger or thumb of the person into alignment with the fingerprint comparison images in the database. A Helium-Neon (HE—NE) laser is directed through the prism and the person's fingerprint, or reference image, is displayed on one side of an optically addressed spatial light modulator (SLM) at the input plane of the optical correlator. The comparison images display in intervals or cycles on the second side of the SLM. After displaying the comparison image, a charge-coupled device (CCD) camera captures light intensities at the output plane of the optical correlator. One of the light intensities at the output plane represents a measure of the cross-correlation between the reference image and the comparison image. Upon comparing the measures of similarity, the closest fingerprint match to the person is determined.

The feasibility and speed of optical correlation is limited by the resolution of the coherent images at the input plane. Optical correlators quite frequently have identical, multi-element lenses (on the order of 150 lin pairs/mm) to Fourier transform the images displayed at an input plane onto the Fourier transform plane and to inverse Fourier transform the joint power spectrum onto the output plane. For less demanding applications, two projector objectives of large aperture having appropriate focal lengths can provide the optical system for non-optimized performance. SLM's provide a very practical, high-resolution display to project coherent images at the input plane. SLMs may include liquid-crystal, magnetic-optic, deformable mirror, or multiple quantum well implementations. However, fabrication processes and materials limit the resolutions available from the SLM as the yield rates go down and costs goes up nonlinearly for linear increase in horizontal resolution. The limited resolution, as well as the resolution of the input images, limits the amount of information, or number of images, that can be compared in one cycle of the optical correlator. For instance, the SLM may hold the two fingerprints, the reference image and the comparison image, in one cycle and then the reference image and a second comparison image in the next cycle. Even though the reference fingerprint must be compared against thousands or millions of fingerprints, and three fingerprints are taken for each person to provide an accurate identification, only two fingerprints are compared in one cycle of one joint-transform optical correlator. Therefore, the parallel-processing advantage of optical correlators may remain impractical for many applications, e.g. a routine traffic stop.

BRIEF FIGURE DESCRIPTIONS

In the accompanying drawings, like references may indicate similar elements:

Figure 3B:
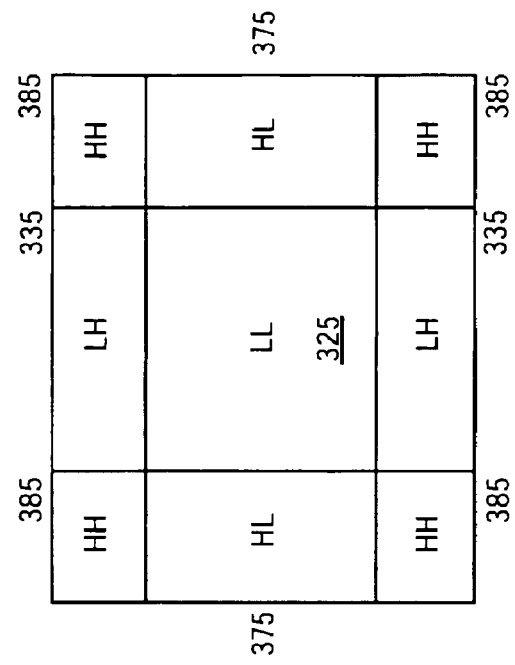
Figure 3A:
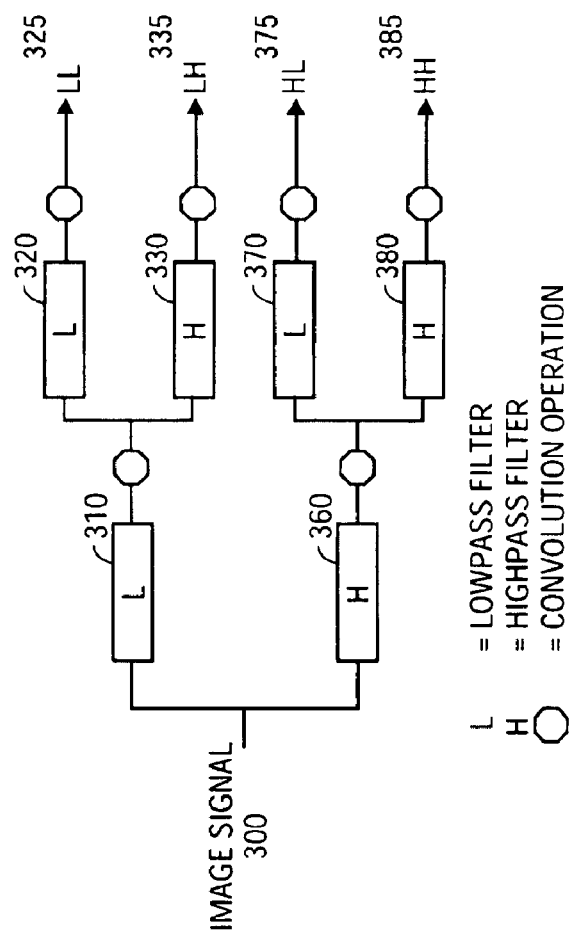

FIGS. 3A–B depict an embodiment of a quadrature mirror filtering technique.

Figure 3C:
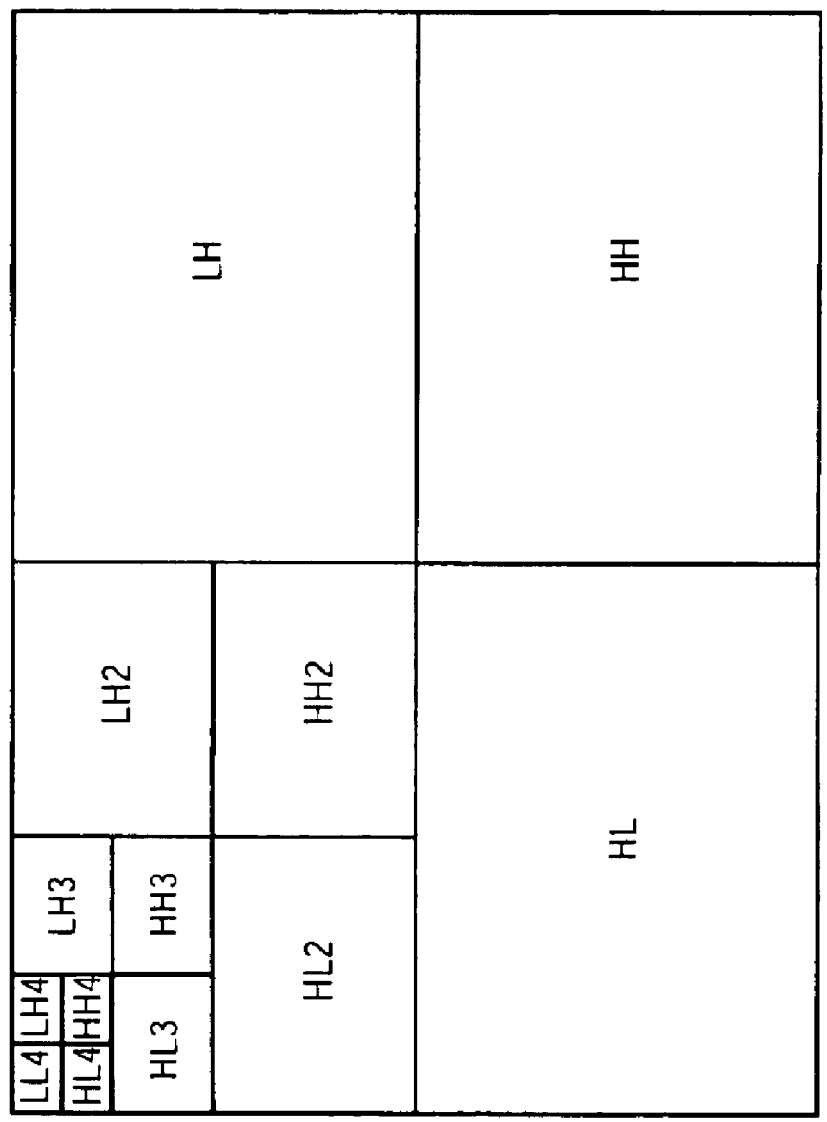
Figure 3D:
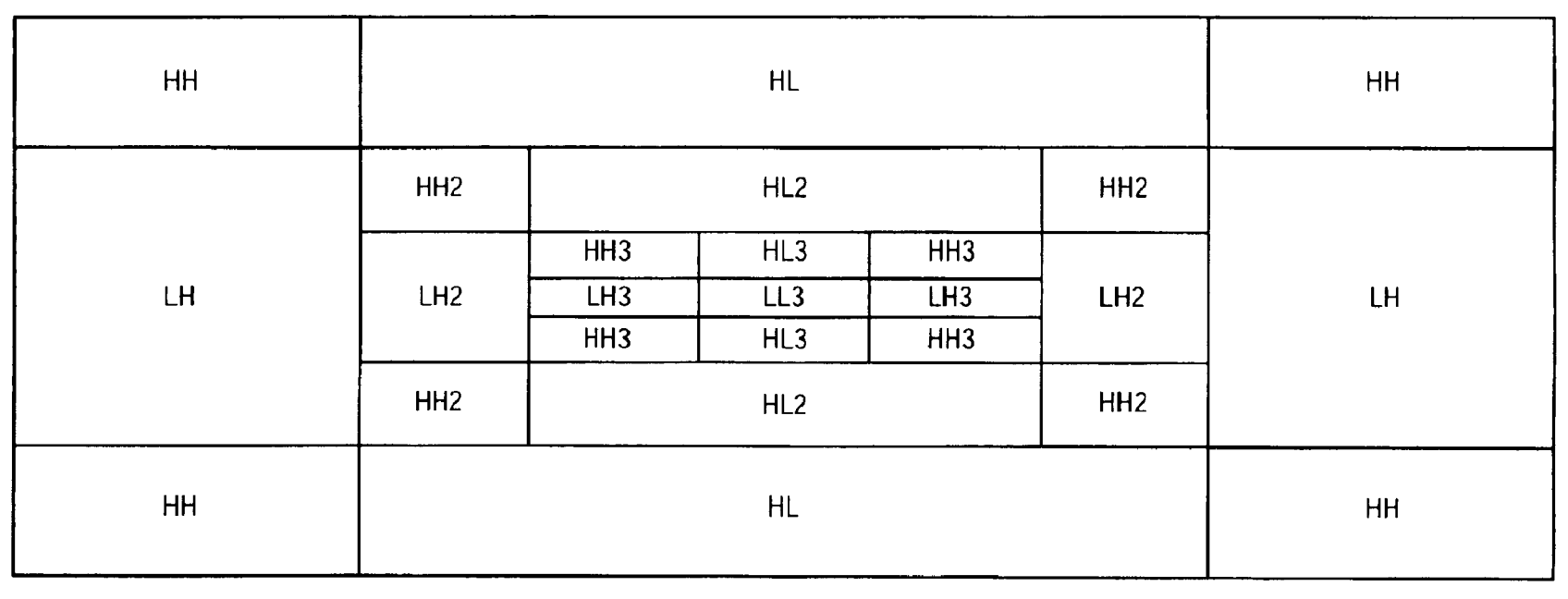

FIGS. 3C–D depict embodiments of displays for coefficients from filtering techniques.

Figure 4:
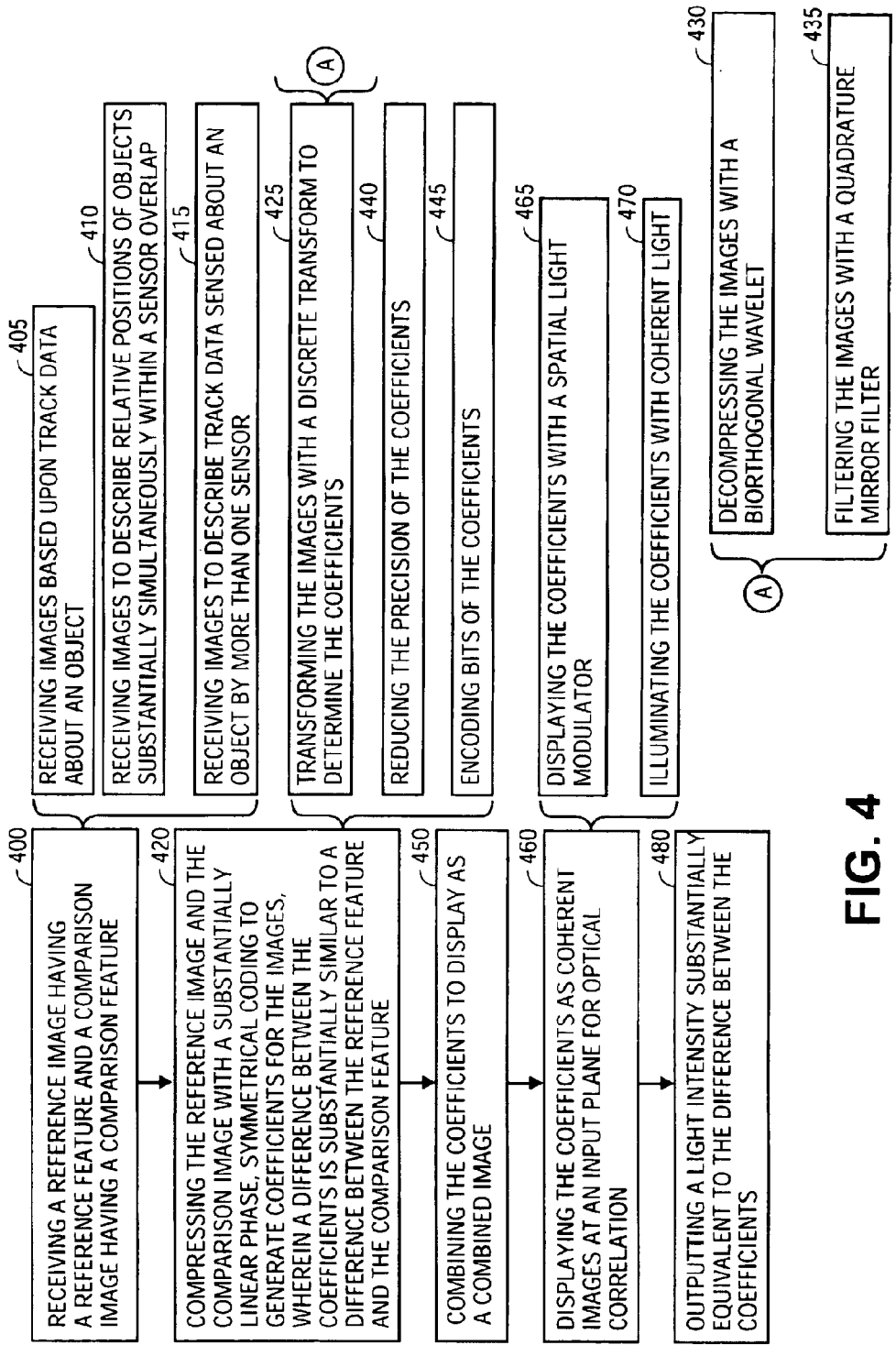

FIG. 4 depicts a flow chart of an embodiment to enhance optical correlation with image compression.

Figure 5:
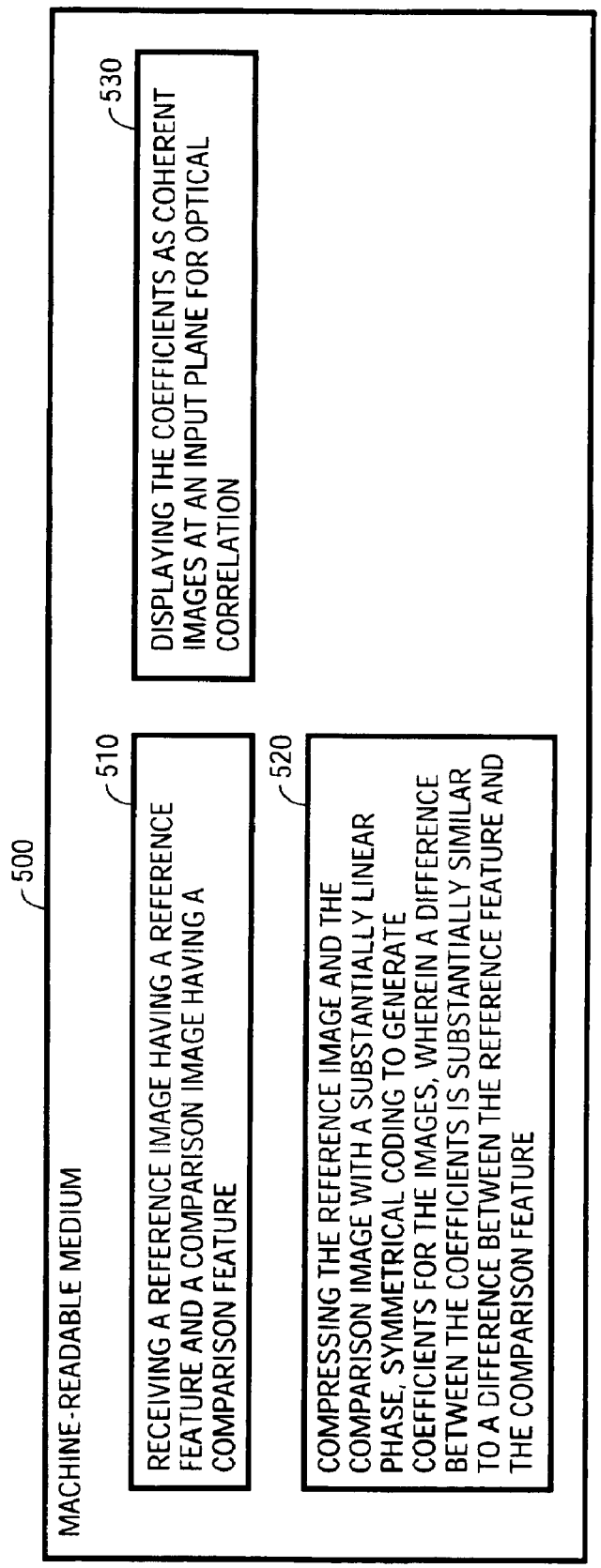

FIG. 5 depicts an embodiment of a machine-readable medium comprising instructions to enhance optical correlation with image compression.

Skilled artisans appreciate that elements in the figures are illustrated for simplicity and clarity and have not necessarily been drawn to scale. For example, the dimensions of some of the elements in the figures are exaggerated relative to other elements to help to improve understanding of embodiment(s) of the present invention

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments. The variations of embodiments anticipated for the present invention are too numerous to discuss individually so the detailed descriptions below are designed to make such embodiments obvious to a person of ordinary skill in the art.

Embodiments of the invention encompass systems of process and/or equipment to compress images for optical correlation such as fingerprint images, images based upon track data from sensors, seismic images, facial images, or other images wherein a comparison provides useful data. In many of the embodiments of the invention, the sensors may comprise radars, global positioning systems, laser target designators, seismic sensors or systems of seismic sensors comprising hydrophones and geophones, and other similar systems. Some embodiments of the invention may compress images generated for correlating objects and gridlocking the sensors, wherein the images are based upon track data from the sensors. One image generation technique, incorporated herein by the following reference, is described in a co-pending patent application entitled "Methods and Arrangements to Enhance Correlation", Ser. No. 10/093,873, filed on the same day, and assigned to Anzus, Inc. Another such technique, incorporated herein by the following reference, is described in a co-pending patent application entitled "Methods and Arrangements to Enhance Gridlocking", Ser. No. 10/094,037 filed on the same day, and assigned to Anzus, Inc.

While some embodiments of the invention may comprise an optical correlator, many embodiments perform some analyses statistically. A statistical technique may comprise Kalman filtering, probabilistic data association filtering, Neyman-Pearson hypothesis testing, and a Munkres assignment, or the like. Optical techniques may comprise frequency plane correlation, electrically addressed spatial light modulation and optically addressed spatial light modulation, joint transfonn correlation, or a hybrid correlation. One such technique, incorporated herein by the following reference, is described in a co-pending patent application entitled "Gridlocking and Correlation Methods and Arrangements", Ser. No. 10/093,535, filed on the same day, and assigned to Anzus, Inc. In addition, many embodiments of the invention comprise software that can execute on a laptop, desktop, or similar computer.

Figure 1:
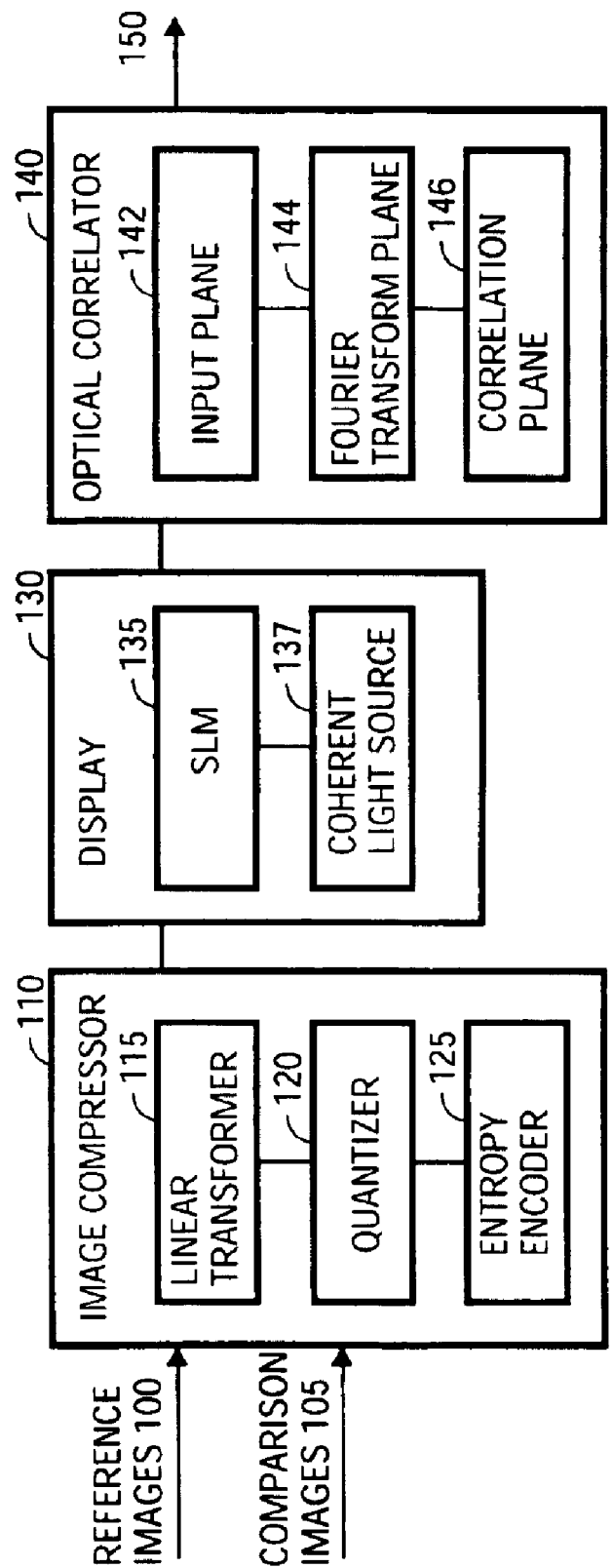
FIG. 1 depicts an embodiment of a system to enhance optical correlation with image compression.

Referring now to FIG. 1, there is shown an embodiment of a system to enhance optical correlation with image compression. The embodiment may comprise image compressor 110, display 130, and optical correlator 140. Image compressor 110 may receive images, reference images 100 having reference features and comparison images 105 having comparison features, and compress the images with a substantially linear phase, symmetrical coding. The compression coding may generate coefficients wherein a difference between the coefficients is substantially similar to a difference between the reference feature and the comparison feature.

Reference images 100 and comparison images 105 may comprise images such as fingerprint images, images based upon track data, seismic images, facial images, or other images to compare. For example, reference images 100 may comprise images based upon a first track about a first object and comparison images 105 may comprise images based upon a second track about a second object sensed substantially simultaneously with the first track to facilitate a correlation of objects from sensors and/or gridlocking of sensors. When gridlocking sensors, for instance, reference images 100 and comparison images 105 may be designed to compare the relative locations of several objects with respect to two or more sensors. In some of these embodiments of the invention, the reference and comparison images may have been transformed to a single coordinate system with a less than accurate transformation.

In addition, reference images 100 and comparison images 105 may comprise at least one reference feature and comparison feature, respectively. The features may convey the information to compare between a reference image and a comparison image. For example, when a reference image and comparison image are generated to gridlock a reference sensor with a comparison sensor, the reference feature may comprise a feature based upon the relative locations of objects within a sensor overlap of the reference sensor and the comparison sensor, as sensed by the reference sensor. Similarly, the comparison image may comprise a comparison feature to convey the relative positions of objects sensed by the comparison sensor within the same sensor overlap. Thus, image compressor 110 may generate a set of approximation coefficients, a set of detail coefficients, or a mixture of both, to convey the same or substantially equivalent data or information such that the light intensity output by the optical correlator 140, in response to a comparison of the coefficients, may comprise data to facilitate transforming the tracks of the comparison sensor to the coordinate system of the tracks of the reference sensor or to facilitate transforming tracks from both sensors to another coordinate system.

Image compressor 110 may comprise linear transformer 115, quantizer 120, and entropy encoder 125. Linear transformer 115 may generate the coefficients of the images with a discrete transform such as a discrete wavelet transform (DWT), discrete Fourier transform (DFT), discrete cosine transform (DCT), or the like. DWT may comprise successive approximations or improvements to approximations of an image by superimposing a set of wavelets or basis functions. DWT may outperform many other discrete transforms since DWT may not break an image into blocks or smaller images for compression. Blocking may produce artifacts such as asymmetrical artifacts at the edges of the blocks. Compression with DWT may comprise selecting a mother wavelet and generating a set of wavelets to represent the image signal by dilating or contracting (scaling) and/or translating (shifting) the mother wavelet.

Further, DWT may facilitate progressive transmission of images since DWT successively improves the quality of an image with additions of scaled and shifted wavelets for narrower subbands. In some embodiments of the invention, image compressor 110 may compress images to a level of compression based upon the number of images received by image compressor 110. For example, display 130 may comprise a resolution to display four reference and comparison images of fingerprints. Image compressor 110 may decompose the reference and comparison images with DWT to coefficients four to 30 times smaller. The coefficients may, however, maintain features substantially equivalent to the reference and comparison features of the fingerprints. In a high level scan of fingerprints, or a scan to see if any of the thousands of fingerprints are similar to the reference fingerprint, an image selection system may select a small subset of images to compare against the reference fingerprint in a cycle of optical correlator 140. Image compressor 110 may decompose the reference and comparison images to coefficients having a low, lossy resolution to facilitate displaying one hundred and twenty images with display 130. The reference features and comparison features may be conveyed to an extent in the coefficients. The extent that the features are conveyed may provide sufficient data or information to distinguish the reference fingerprint from most or many of the fingerprint comparison images but not sufficiently to confirm a match. After several cycles of comparison and matching ten fingerprints with the high level scan, image compressor 110 may receive the ten fingerprints for comparison with a detailed or low level scan. Image compressor 110 may allow DWT to perform several successive approximations until the coefficients have a higher, lossless resolution. The comparison that follows by optical correlator 140 may provide a more accurate comparison of the fingerprint images, possibly accurate enough to confirm a match, or sufficiently accurate to eliminate one or more of the remaining ten comparison images.

DFT, a technique for converting a signal into elementary frequency components, and DCT may comprise similar decomposition except DCT may be real valued and may provide a better approximation of a signal with fewer coefficients than DFT. DCT may comprise a discrete-time version of the Fourier-Cosine series and image compressor 110 may compute the coefficients with a Fast Fourier Transform (FFT) type of algorithm. DCT-based encoding may compress a stream of eight by eight blocks of image samples of a color. The compression begins by concentrating most of the signal in lower spatial frequencies. For instance, coefficients for an eight by eight block of an image may comprise a zero or near zero amplitude so the spatial frequencies may not be encoded.

In some embodiments of the invention, image compressor 110 may comprise quantizer 120 to reduce the precision of the coefficients. Quantizer 120 may perform a function analogous to rounding to the nearest integer to reduce the number of bits used to form coefficients. Quantizer 120 may comprise a quantization table (QT) designed to facilitate quantization in conjunction with the transformation of linear transformer 115. QT may comprise patterns of bits and patterns of bits in the coefficients may be approximated and/or matched with patterns in QT. A smaller number of bits indicating an address in the QT may replace the matched or approximated patterns. Further, the selection of the patterns in the QT may be based upon the images or types of images to compress since the selection of patterns may have an impact on the extent of compression as well as the extent of distortion introduced.

In several embodiments of the invention, image compressor 110 may comprise entropy encoder 125 to compress the coefficients. Entropy encoder 125 may achieve compression by encoding the coefficients based upon statistical characteristics. In particular, entropy encoder 125 may build or comprise a list or table of symbols corresponding to a sequence of data and insert the symbol, or leave the symbol for each occurrence of the sequence. Entropy encoding may be lossless. In further embodiments of the invention, entropy encoder 125 may operate in conjunction with quantizer 120.

Display 130 may couple with image compressor 110 to display the coefficients as coherent images at an input plane for optical correlation. Display 130 may comprise a spatial light modulator, SLM 135, and may display coefficients for reference images 100 and comparison images 105 as coherent images at the input plane, or the object plane, of optical correlator 140. SLM 135 may portray the image as a coherent image with a coherent light source 137 such as a laser. Coherent light source 137 may comprise optical elements to produce a collimated beam of a size to illuminate the one or more SLM.

Further embodiments of the invention comprise optical correlator 140. Optical correlator 140 may couple with display 130 at the input plane 142 of optical correlator 140 to output, via output 150, a light intensity to represent the difference between the coefficients. The light intensity may comprise an interference intensity substantially proportional to a cross-correlation, or a nonlinear function of, the reference image with the comparison image or with more than one comparison image and optical correlator 140 may output the interference intensity in response to displaying the coefficients associated with the reference images 100 and comparison images 105 at input plane 142.

Optical correlator 140 may comprise input plane 142, Fourier transform plane 144, and correlation plane 146. Input plane 142 may comprise the object plane of a Fourier transform lens for optical correlator 140. The Fourier transform lens may optically transform the coefficients at input plane 142 into an equivalent analog Fourier transform of the coefficients at Fourier transform plane 144. Also, the product of the Fourier transform of the coefficients may project onto the Fourier transform plane. The product may comprise an interference term that may be equivalent to or substantially proportional to the Fourier transform of the cross-correlation, or related, nonlinear function of the reference image and the comparison image.

In many embodiments of the invention, a correlation filter may be located at the output of Fourier transform plane 144 to binarize the image at the Fourier transform plane using a threshold function to produce a signal for a binary SLM. The Fourier transform plane 144 may be at an input plane for a lens to inverse Fourier transform the product of the Fourier transform of the coefficients. The inverse Fourier transform may output to correlation plane 146. In many embodiments, one or more focal adjustment lenses may be inserted into the Fourier lens system to adjust the focal lengths or points of the Fourier transform and inverse Fourier transform lenses, reducing the distance between the planes, 142, 144, and 146, as the SLM technology decreases in size and thus may decrease the instantaneous field of view (IFOV) of each element and corresponding focal length.

In further embodiments, the Fourier transform, inverse Fourier transform, focal adjustments, and/or a combination thereof, may be accomplished by converting the signals to digital or analog electrical signals. The digital or analog electrical signals may be manipulated via a computer, state machine, or the like. For example, an embodiment may perform filtering by means of a computer and may locate a detector or charge-coupled device at Fourier transform plane 144, perform the filtering with the computer, and display the resulting image with a coherent SLM at a correct focal length for the inverse Fourier transform lens of optical correlator 140.

Optical correlator 140 may comprise a frequency plane correlator, a joint transform correlator, or a hybrid correlator. The joint-transform optical correlator, however, may offer an advantage of using a completely or partially optical system train to display the reference image and comparison image through the correlator and to the correlation plane, and provide an insensitivity to the alignment of the reference images 100 and the comparison images 105 in the object plane. Displaying reference images 100 and comparison images 105 on the same display may also reduce efforts to cause more than one SLM to display the images at the input plane 142. In some embodiments, the outputs of multiple SLM devices may be optically combined to represent a larger input plane using a mirror-coated series of wedges that may be placed around an axis of symmetry along the body of the correlator. The main difference between the joint-transform optical correlator and the frequency plane correlator is the use of spatial domain representation of filters. Further, a non-linear optical correlator may provide a greater image discrimination sensitivity, as well as a greater interference peak intensity and bandwidth with respect to a linear optical correlator.

Optical correlator 140 may comprise a linear or non-linear joint-transform correlator. A joint-transform optical correlator may not require a matched spatial filter in the correlation process so the comparison of the reference image with the comparison image(s) may comprise continuously or substantially continuously updating the coefficients for the image(s). For instance, when the reference image and comparison images are generated to gridlock a reference sensor with more than one comparison sensor, a combined image may comprise coefficients for the reference image and comparison images of sensors one through one hundred at a zero degree rotation. Each of the one hundred sensors may comprise a common sensor overlap. Image compressor 110 may receive rotated images of each of the one hundred comparison sensors in succession or substantially in succession to update the coefficients of the one hundred comparison images until the comparison images may rotate approximately 360 degrees. Optical correlator 140 may continuously or substantially continuously output the difference between the coefficients of the reference image and the coefficients of the comparison images, as the images are rotated to facilitate determination of one hundred coordinate transformations substantially within the time to rotate the comparisons images 360 degrees. In other embodiments, a combined image may comprise more or less than one hundred comparison images for comparison with a reference image, depending upon the number of sensors to gridlock, for instance, the extent of compression, and the resolution of SLM 135.

In further embodiments, optical correlator 140 may comprise a function encoded joint-transform optical correlator. In such embodiments, display 130 may display the reference image and the comparison image in different input planes of optical correlator 140. For instance, in the function encoded joint-transform optical correlator, the joint power spectrums of the coefficients for the comparison image and the reference image may be encoded with different phase functions. The different phase functions, such as quadratic phase functions, may encode the correlation terms such that the correlation terms are focused on different output or correlation planes. The autocorrelations on the optical axis may focus on one correlation plane and the off-axis cross-correlation terms may also output into different correlation planes. As a result, the interference intensities proportional to or substantially proportional to the cross-correlations between the reference and comparison image(s) may output on one correlation plane and the interference intensities proportional to or substantially proportional to autocorrelations and cross-correlations of the comparison images may output onto a different correlation plane.

In the present embodiment, optical correlator 140 may comprise a non-linear joint-transform optical correlator. The non-linear joint-transform optical correlator may comprise correlation filter 135, a non-linear filter at the Fourier transform plane 144 to improve the optical correlation performance in terms of light efficiency, correlation peak size, output noise level, and sensitivity against similar objects. Correlation filter 135 may comprise a phase-only filter, a filter for a first-order correlation term of a binary joint transform optical correlator using a threshold function, or the like. The threshold function may modify the interference pattern between the coefficients for a reference image and a comparison image on the Fourier transform plane 144 to values of plus one or minus one and the first-order harmonic term may comprise the correct phase information of the joint power spectrum.

Figure 2:
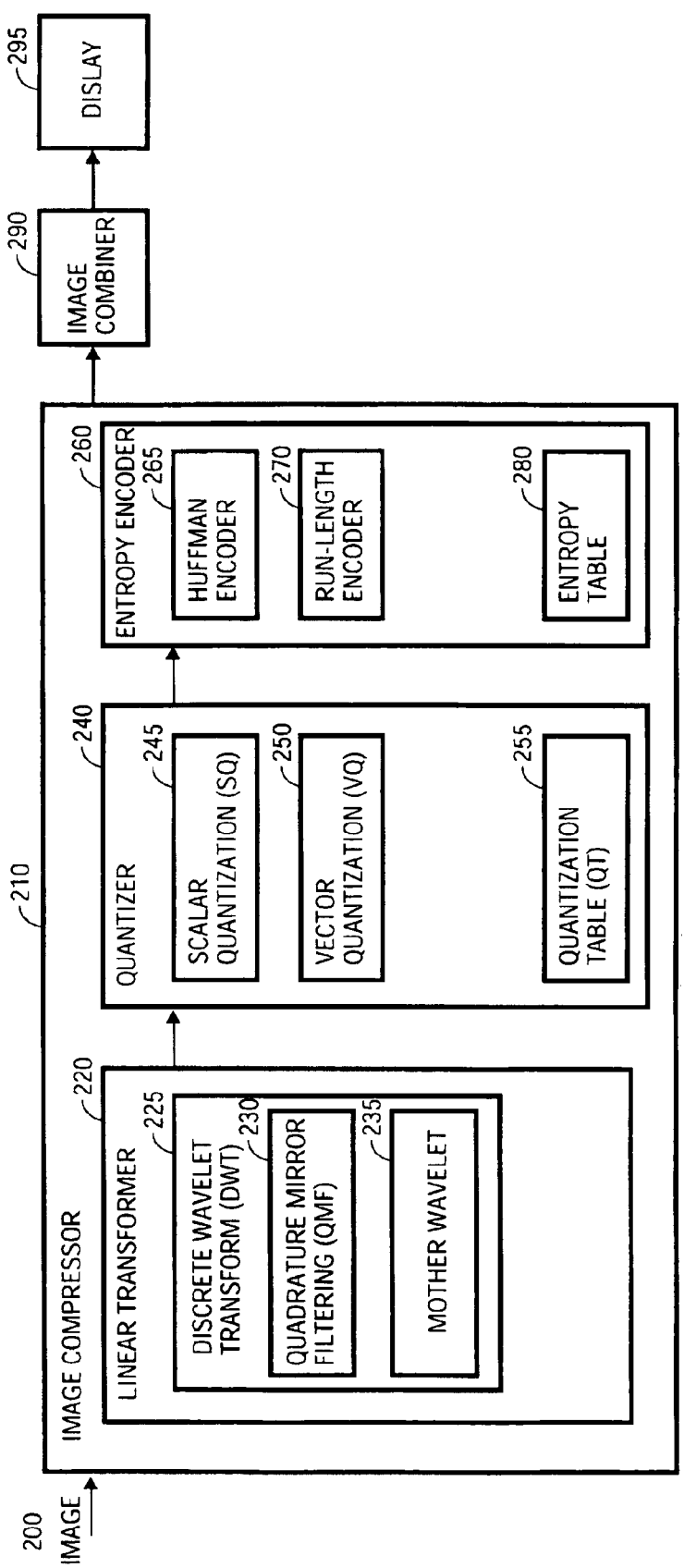
FIG. 2 depicts an embodiment of an apparatus to enhance optical correlation with image compression.

Referring now to FIG. 2, there is shown an embodiment of an apparatus to enhance optical correlation with image compression. The embodiment may comprise image compressor 210, image combiner 290, and display 295. Image compressor 210 may receive images comprising a reference image having a reference feature and a comparison image having a comparison feature via image 200 and compress the images with a substantially linear phase, symmetrical coding to generate coefficients. The difference between the coefficients may be substantially similar to the difference between the reference feature and the comparison feature.

Image compressor 210 may implement lossy and/or lossless data compression techniques. Lossy data compression techniques cause image quality degradation in each compression/decompression step but provide high compression ratios with respect to lossless data compression techniques. Lossy data compression techniques may comprise transform coding, quantization, segmentation and approximation, spline approximation, fractal coding, and the like. Lossless data compression techniques may compress and decompress images without image degradation. Lossless data compression techniques may comprise entropy encoding such as Huffman encoding, arithmetic encoding, run-length encoding, area encoding, Lempel/Ziv encoding, and the like.

Image compressor 210 may comprise linear transformer 220, quantizer 240, and entropy encoder 260. Linear transformer 220 may comprise lossy data compression techniques to generate the coefficients of the images with substantially linear phase. In many embodiments of the invention, transforming the images with substantially linear phase may degrade orthogonality. Linear transformer 220 may comprise DWT 225.

DWT 225 may decompose images into coefficients by modeling frequencies with a set or sets of functions. In the present embodiment of the invention, DWT 225 may comprise circuitry to decompose the images with respect to a basic wavelet shape, referred to as a mother wavelet, in accordance with a circuitry to implement quadrature mirror filtering, QMF 230. DWT 225 may comprise mother wavelet 235, or memory to store wavelets (and their QMF filter coefficients) for use as a mother wavelet and, in some embodiments of the invention, mother wavelet 235 may comprise a biorthogonal wavelet such as biorthogonal wavelet class 1.3, or a representation thereof. The mother wavelet may provide the basis for modeling frequency bands, or shapes or features characteristic of the input object. The mother wavelet may approximate an image, or a signal representing an image, by splitting the image into frequency subbands and determining low or zero valued coefficients to scale and shift the mother wavelet to match one or more frequencies within the subband.

A decoder may use the mother wavelet and the wavelet coefficients to decode the images. However, the present embodiment of the invention may transmit the coefficients for comparison by optical correlation. In further embodiments of the invention, the coefficients may be compared or cross-correlated statistically or in part by statistical methods and in part by optical correlation techniques.

The mother wavelet may comprise orthogonal wavelets and biorthogonal wavelets. Orthogonal wavelets may comprise a wavelet function and a scaling function for QMF. Decomposition of a signal, such as an image, may comprise convolving the scaling function and wavelet function with the image to determine coefficients for the scaling function and wavelet function, and the coefficients may be determined at successively increased levels of scale, or detail. Orthogonal wavelets comprise asymmetrical wavelets, except Haar, and decomposition of images by orthogonal wavelets preserve orthogonality at the expense of linear phase. Although some filtering techniques, such as non-linear filtering techniques similar to those used in analog to digital filter mapping, may substantially maintain a linear phase after and/or during decomposition with an orthogonal wavelet.

Biorthogonal wavelets may comprise a unique wavelet and scaling function pair for both the decomposition and reconstruction process. One pair comprising a wavelet function and a scaling function may convolve with the image to decompose the image into coefficients and the other pair may convolve with the coefficients to reconstruct the image. Biorthogonal wavelets may comprise symmetric wavelets for decomposition and reconstruction so biorthogonal wavelets may provide an advantage for linear phase filtering. Symmetric wavelets may allow extension at the image boundaries and may prevent image contents from shifting between subbands. In some embodiments of the invention, the mother wavelet may comprise coiflets, infinite support wavelets, and multi-wavelets.

In the present embodiment, maintaining linear phase in the coefficients by decomposing with a biorthogonal wavelet may provide better control over optical correlation. For example, coefficients encoded with different phases may focus on different Fourier transform and correlation planes, which, in some embodiments of the invention, may result in interference intensities associated with the comparison of the coefficients forming in part on different output planes.

QMF 230 may provide a two-level subband coding such as the subband coding depicted in FIGS. 3A and 3B. In particular, FIG. 3A depicts splitting an image signal 300 into four subbands, LL 325, LH 335, HL 375, and HH 385, and FIG. 3B depicts the coefficients for LL 325, LH 335, HL 375, and HH 385 in the form of an image for display on display 295. For example, image signal 300 may split into two subbands based upon lowpass filter (L) 310 and highpass filter (H) 360. The two subbands may individually convolve with the mother wavelet to produce a first level of coefficients. The lower subband may then split into two narrower subbands based upon L 320 and H 330. Similarly, the higher subband may split into two narrower subbands via L 370 and H 380. The four subbands may separately convolve with the mother wavelet to generate coefficients to provide additional detail to the coefficients. Since the original images may be decoded from the coefficients with insubstantial degradation to reference features and comparison features, the coefficients may comprise substantially equivalent features, data, or information to compare or cross-correlate via optical correlation.

The display of the coefficients, such as the displays depicted in FIGS. 3B–D, may facilitate optical correlation depending upon the content of the images. FIG. 3B may comprise some combination of coefficients between the 2-D pyramid architecture of typical QMF schemes and the wavelet packet techniques of Wickerhauser and Coiffman. In some embodiments, an image generation system may generate an image comprising a feature(s) distributed about an axis or axes of symmetry. Arrangement of the wavelet coefficients can be effective at economy of space with an axis of symmetry (or quasi-symmetry) between one or more of the four subbands such that the feature(s) reside substantially within the LL 325 subband or are distributed between LL 325 and another subband. The symmetric nature of the distributions may facilitate an output of light intensities with a high signal-to-noise ratio. For instance, a level two, two-dimensional (2D) decomposition may generate: L2, LH2 HL2 HH2, LH1, HL1, HH1. In some embodiments, LL information (approximation coefficients) may comprise the feature(s) to a greater extent than HH information (the highest frequency or lowest scale information) when an image comprises Gaussian, white noise, or correlated noise. The LH and HL may comprise the diagonal, horizontal, and vertical detail coefficients for a given scale. Some of the HL and LH information may comprise information about the feature(s) while the HH2 information may be the least likely to comprise the feature(s). So in FIG. 3B given an origin at LL, along a radial the likelihood of keeping the coefficients in a particular subblock may go down with radius. An alternative coefficient arrangement may comprise a 512×512 pixel image with a level two decomposition having LL2 with 128×128 coefficients; HH1 with 256×256 coefficients (as do LH1 and HL1); and LH2, HL2, and HH2 having 128×128 coefficients. So the dimensions of FIG. 3B may differ between various embodiments.

FIGS. 3C and 3D depict other embodiments to display the coefficients. Further, FIGS. 3C and 3D comprise example embodiments for four levels or scales of coefficients. In particular, FIG. 3C may comprise the same coefficients in different display arrangement than FIG. 3D as a result of half shifting. LL4 may comprise a set of fourth-level approximation coefficients. LH, LH2, LH3, and LH4 may comprise the first through fourth level vertical detail coefficients. HL, HL2, HL3, and HL4 may comprise the first through fourth level horizontal detail coefficients. And HH, HH2, HH3, and HH4 may comprise first through fourth level diagonal detail coefficients. An image may be broken down into coefficients one level at a time and when the parent level comprises more entropy than the sum of the child levels, or the selected optimal child levels, the parent may be split into further approximation and/or detail coefficients. However, FIG. 3D differs from FIG. 3C in terms of symmetry and information density. In FIG. 3D, for instance, the density of data associated with feature may peak at the center, LL3, and decrease with increasing radius from the center. For example, LL3 may comprise more data regarding the features than LH3, LH2, or LH; LH3 may comprise more data regarding the features than LH2; and LH2 may comprise more data about the features than LH. In further embodiments, the rectangle or square footprints of the coefficients may be adjusted to provide a footprint of a circle, ellipse, geometrical shape, or other, to reduce the number of pixels to display the coefficients on an SLM.

Referring again to FIG. 2, image compressor 210 may comprise quantizer 240 to reduce the precision of the coefficients, reduce the amount of information within the coefficients, or match the digital precision of an input device such as a spatial light modulator. Quantizer 240 may comprise scalar quantization (SQ) 245, vector quantization (VQ) 250, and quantization table (QT) 255. SQ 245 may provide zonal coding or threshold coding. Zonal coding may reduce the data in the coefficients within a determined area. Threshold coding may comprise selecting a coefficient for each block characterized by an absolute value exceeding a threshold value. QT 245 may comprise the determined area for zonal coding and/or may comprise coefficients and threshold values for threshold coding.

VQ 250 may lead to a higher compression ratio than SQ 245, in some embodiments of the invention. VQ 250 may compress by substituting groups of bits, or vectors, with addresses in a codebook. The codebook may be stored in QT 255 and may comprise vectors corresponding to the addresses. VQ 250 may search for occurrences of the vector and may substitute a vector address for the vector. The design of the vectors may have an impact on the compression ratio of an image and may depend upon the types of images to compress. For instance, one codebook may comprise vectors to compress images generated to correlate objects in a sensor array after DWT and a second codebook may be designed to compress images designed to gridlock sensors having a sensor overlap after DWT. In several embodiments of the invention, codebooks may be designed according to algorithms such as the Linde, Buzo, and Gray (LBG) algorithm. Further embodiments of the invention may not comprise quantizer 240 or may comprise either SQ 245 or VQ 250.

Entropy encoder 260 may compress the coefficients with lossless encoders and may comprise Huffman encoder 265, run-length encoder 270, and/or the like. Entropy encoder 260 may also comprise entropy table 280 to store data for one or more of the encoders. In embodiments of the invention comprising quantizer 240, entropy encoder 260 may be adapted to operate in conjunction with the quantization scheme(s) implemented. Huffman encoder 265 may build a weighted binary tree according to the rate of occurrence of tokens or elements. Each element in the tree may be assigned a code word or a sequence of bits having a length based upon the position of the code word within the tree. Less common elements in the image may be assigned a longer code word and more common elements may be assigned a shorter code word.

Run-length encoder 270 may comprise a fast and simple method for compression of sequential data. Run-length encoder 270 may check a data stream for repetitive tokens and at an occurrence of two or more tokens in sequence, run-length encoder 270 may insert a code to indicate the occurrence of the two or more tokens.

In further embodiments, the coefficients of linear transformer 220 may compress the images to a quarter of the data of the images and the coefficients may transmit to display 295 without further compression. For instance, when the reference and comparison images are generated to correlate objects, the images may comprise data of current and/or historical tracks for an object as sensed by two or more sensors. In instances wherein many objects may be located within the area of the object, data sensed of the objects may comprise many similarities. Thus, lossless data compression by linear transformer 220, and/or by entropy encoder 260 may provide an advantageous level of comparison.

Display 295 may couple with image compressor 210 via image combiner 290 to display the coefficients as coherent images at an input plane for optical correlation. Embodiments of the invention may comprise an image combiner 290 to combine reference and comparison images into a combined image for use by a joint-transform optical correlator. The combined image may comprise a signal to display the coefficients for the reference image on one side of display 295 and the coefficients for one or more comparison images on the second side of display 295. A separation between the coefficients for the reference image and the comparison images, as well as between coefficients for the comparison images may be based upon specifications of a joint-transform optical correlator. For instance, the interference intensity, from a comparison of the coefficients, may be twice the distance from the on-axis autocorrelation intensity in the correlation plane, as the center of the coefficients for a comparison image is from the center of the coefficients for a reference image in the input plane of the joint-transform optical correlator.

Display 295 may receive a combined image comprising coefficients for a reference image and a comparison image to display as a coherent image. The reference image may comprise track data from a first track about a first object and the comparison image may comprise track data from a second track about a second object. In some situations, the comparison image may be generated to determine whether the second object is the first object. Embodiments may correlate the tracks with a reference image and comparison image based upon all or some of the track data available for the objects. Track data available for the objects may comprise data from current tracks and prior tracks. Track data about the same object sensed substantially simultaneously may appear as distinguishable patterns or features in the images even in situations wherein the reference image or the comparison image may comprise more historical track data. Those patterns or features may be conveyed or approximately conveyed in coefficients. For example, the first sensor may begin tracking an object or target before the object enters the scope of a second sensor. The first sensor may generate three tracks, $F_{T0}$, $F_{T1}$ and $F_{T2}$ before the object enters the range of the second sensor and may receive a track at $F_{T3}$ almost simultaneously with the generation of track $S_{T0}$. The reference image may comprise four columns of data comprising a first color representing the position of the object and a second color representing the velocity of the object at each time reference or sequence, T0, T1, T2 and T3. The comparison image may comprise an image with one column to represent time reference or sequence T0. Since the data of track $S_{T0}$ may closely match the data of track $F_{T3}$, column T3 of the reference image may closely match column T0 of the comparison image. In other embodiments, columns may comprise data based upon time stamps associated with the data or the time or time frame the data represents.

Display 295 may comprise a spatial light modulator SLM to display the combined image at the input plane of a joint-transform optical correlator. The SLM may comprise a color, gray-scale or binary, electrically addressed or optically addressed SLM. The selection of the SLM may depend upon the type of input received. For example, an embodiment may receive coefficients for a reference and comparison image for gridlocking. The coefficients may comprise a binary representation of features to describe relative positions of objects within a sensor overlap of the reference sensor and the comparison sensor so display 295 may comprise a binary SLM to display the coefficients. Other embodiments, such as embodiments to correlate tracks based upon locations and velocities of an object, may receive images with multiple variations of colors, opacities, or grays to represent different distances.

Referring now to FIG. 4, there is shown a flow chart of an embodiment to enhance optical correlation with image compression. The embodiment may comprise receiving a reference image having a reference feature and a comparison image having a comparison feature 400; compressing the reference image and the comparison image with a substantially linear phase, symmetrical coding to generate coefficients for the images, wherein a difference between the coefficients is substantially similar to a difference between the reference feature and the comparison feature 420; combining the coefficients to display as a combined image 450; displaying the coefficients as coherent images at an input plane for optical correlation 460; and outputting a light intensity substantially equivalent to the difference between the coefficients 480. Receiving a reference image having a reference feature and a comparison image having a comparison feature 400 may receive a signal generate to display images to compare with an optical correlator such as images to correlate objects, gridlock sensors, match fingerprints, match faces, or similar images.

Receiving a reference image having a reference feature and a comparison image having a comparison feature 400 may comprise receiving a combined image. Receiving a combined image may receive an image incorporating the reference image and one or more comparison images. For example, the spacing between the reference image and a comparison image in the combined image may be a fixed distance, (Yo), about the center of the input plane. The output of a linear joint-transform optical correlator in the correlation plane may comprise an autocorrelation centered on the correlation plane, unless a high pass filer is used to block direct current (DC) light, and side lobes comprising interference intensities substantially equivalent to the cross-correlation of the reference image and the comparison image at a distance of 2Yo from the center.

Receiving a reference image having a reference feature and a comparison image having a comparison feature 400 may comprise receiving images based upon track data about an object 405; receiving images to describe relative positions of objects substantially simultaneously within a sensor overlap 410; and receiving images to describe track data sensed about an object by more than one sensor 415. Receiving images based upon track data about an object 405 may receive images based upon data sensed by sensors such as radars, global positioning systems, laser target designators, seismic sensors or systems of seismic sensors comprising hydrophones and geophones, and other similar systems.

Receiving images to describe relative positions of objects substantially simultaneously within a sensor overlap 410 may receive one or more comparison images per reference image to determine an offset and/or rotation between the sensors associated with the images. In some embodiments, the comparison images may comprise a copy of the reference image. The copy of the reference image may cause an optical correlator to output an autocorrelation of the reference image. The light intensity output in response to the autocorrelation may facilitate normalization of light intensity scales of outputs for different cycles of the optical correlation. The autocorrelation may indicate the highest cross-correlation value for a cross-correlation between coefficients of a reference image and a comparison image. More than one set of correlation values from different sets of images may be normalized based upon corresponding autocorrelation values.

Receiving images to describe track data sensed about an object by more than one sensor 415 may comprise receiving images to describe the positions of objects within the same area, or space or sensor overlap, from two or more different sensors. An image may describe the positions of the objects by distributing features in a pattern equivalent to or substantially equivalent to the pattern of the objects as sensed by a sensor. In some embodiments of the invention, the image may distribute the positions at a linearly or exponentially reduced or magnified scale.

Receiving images to describe track data sensed about an object by more than one sensor 415 may receive a reference image to describe an object based upon at least one track from a first sensor and a comparison image to describe the object based upon at least one track substantially simultaneously sensed by a second sensor. The reference image may describe an object sensed by a reference sensor one or more times over a period of time and the comparison image may describe an object sensed by a comparison sensor one or more times within the same period of time to determine whether the objects are the same object. For example, the reference sensor may sense an object ten times in one minute. The comparison sensor may sense the object six times within the same minute. As a result, a reference image comprising features describing ten tracks of data for the object and a comparison image comprising features describing six tracks of data for the object may be received. When the objects are the same object, six of the features of the reference image may substantially match the six features of the comparison image. However, noisy data from sensors and dropped tracks may affect the degree of similarity between the reference image and the comparison image.

Compressing the reference image and the comparison image with a substantially linear phase, symmetrical coding to generate coefficients for the images, wherein a difference between the coefficients is substantially similar to a difference between the reference feature and the comparison feature 420 may reduce the number of pixels to display the images without significantly degrading the information conveyed by the reference feature(s) and comparison feature(s). The compressed information may comprise coefficients and the reference feature(s) and comparison feature(s) may be reconstructed or substantially reconstructed based upon the coefficients and, for example, the corresponding wavelets for DWT.

Compressing the reference image and the comparison image with a substantially linear phase, symmetrical coding to generate coefficients for the images, wherein a difference between the coefficients is substantially similar to a difference between the reference feature and the comparison feature 420 may comprise redundancy reduction and irrelevancy reduction. Redundancy reduction may remove duplication within a reference and/or comparison image. Irrelevancy reduction may remove parts of the image that may comprise irrelevant information. For instance, in embodiments to gridlock sensors, the relevant information or data within an image may comprise the positions within the image with respect to one another and with respect to the origin of the track data. Thus, for example, a lossless compression of the images for gridlocking comprises the information with respect to the positions although in a more compact format. Further, information with respect to the positions of the tracks may be degraded to an extent with lossy compression but the degraded information may still facilitate a determination of a coordinate transformation between the two sensors within an acceptable margin of error.

Compressing the reference image and the comparison image with a substantially linear phase, symmetrical coding to generate coefficients for the images, wherein a difference between the coefficients is substantially similar to a difference between the reference feature and the comparison feature 420 may comprise transforming the images with a discrete transform to determine the coefficients 425. Transforming the images with a discrete transform to determine the coefficients 425 may transform the images into coefficients to describe a Fourier series, Fourier-Cosine series, set of wavelets, or similar series or set to reduce the amount of data to display.

Transforming the images with a discrete transform to determine the coefficients 425 may comprise decomposing the images with a biorthogonal wavelet 430 and filtering the images with a quadrature mirror filter 435. Decomposing the images with a biorthogonal wavelet 430 may decompose the images into a set of progressively detailed wavelets by convolving the image signal with a mother wavelet. The mother wavelet may comprise two interchangeable pairs comprising a scaling function and a wavelet function for analysis and synthesis. The synthesis pair may be unnecessary in many embodiments of the invention since the decomposed images or coefficients may display at an input plane for an optical correlator.

Filtering the images with a quadrature mirror filter 435 may transform an image by filtering the image signal into subbands and convolving the filtered signals with a mother wavelet. A subband may be further divided into two narrower subbands and convolved with a mother wavelet at another detail level. Filtering may generate the coefficients with linear phase and the resultant coefficients may convey information about the reference and comparison features in the form of scaling and shifting instructions. The scaling and shifting instructions may describe generation of more than one wavelet based upon the mother wavelet.

In some embodiments of the invention, compressing 420 may further comprise reducing the precision of the coefficients 440. Reducing the precision of the coefficients 440 may quantize the coefficients with coding such as a scalar quantization coding and/or a vector quantization coding. Quantization coding may approximate patterns bits based upon bits within an area, bits conforming to a threshold function, or bits having a pattern or approximate pattern. Bit patterns within the coefficients may be replaced with an address for an approximated bit pattern within a table of patterns such as a quantization table.

In further embodiments, compressing 420 may further comprise encoding bits of the coefficients 445 by employing an encoding scheme such as entropy encoding. Encoding bits of the coefficients 445 may replace common sequences of bits with a code to indicate that sequence or may replace the sequence with an address to indicate a sequence within a table such as an entropy table comprising the sequence.

Some embodiments of the invention may comprise combining the coefficients to display as a combined image 450. Combining the coefficients 450 may format a single image to compare coefficients of a reference image(s) against coefficients of one or more other images simultaneously or substantially simultaneously. The combined image may facilitate gridlocking several sensors substantially simultaneously by displaying approximations coefficients of rotated images for several sensors at an input plane of a joint-transform optical correlator.

Displaying the coefficients as coherent images at an input plane for optical correlation 460 may comprise converting an incoherent image into a coherent image. Displaying the reference image and the comparison image as coherent images at the input plane of an optical correlator 410 may comprise displaying the coefficients with a spatial light modulator 465 and illuminating the coefficients with coherent light 470. The incoherent signals of the coefficients may convert into a coherent image by illuminating the SLM with a coherent light source such as an Argon (Ar) or Helium-Neon (He—Ne) laser.

Further embodiments of the invention may comprise outputting a light intensity substantially equivalent to the difference between the coefficients 480. An optical correlator may output a first interference intensity substantially proportional to the cross-correlation of the coefficients of a reference image and a first comparison image and may output a second interference intensity substantially proportional to the cross-correlation of coefficients of the reference image and a second comparison image. The location of the first interference intensity may be within a first area of a correlation plane of the optical correlator based upon the spacing between the coefficients of comparison image and the reference image at the input plane of the optical correlator. Further, the first interference intensity may be offset from the center of the first area based upon an offset between the first comparison image and the reference image as portrayed by the coefficients.

Referring now to FIG. 5, a machine-readable medium embodiment of the present invention is shown. A machine-readable medium includes any mechanism that provides (i.e. stores and or transmits) information in a form readable by a machine (e.g., a computer), that when executed by the machine, may perform the functions described herein. For example, a machine-readable medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc. . . . Several embodiments of the present invention may comprise more than one machine-readable medium depending on the design of the machine.

In particular, FIG. 5 shows an embodiment of a machine-readable medium 500 comprising instructions, which when executed by a machine, cause the machine to perform operations, comprising receiving a reference image having a reference feature and a comparison image having a comparison feature 510; compressing the reference image and the comparison image with a substantially linear phase, symmetrical coding to generate coefficients for the images, wherein a difference between the coefficients is substantially similar to a difference between the reference feature and the comparison feature 520; and displaying the coefficients as coherent images at an input plane for optical correlation 530.

Instructions for receiving a reference image having a reference feature and a comparison image having a comparison feature 510 may comprise instructions to receive types and images for optical correlation. In some embodiments of the invention, instruction to receive a type of image or an image of a certain content may comprise instructions to identify the type or content of the image to facilitate data compression adapted for the type or content of the image.

Instructions for receiving a reference image having a reference feature and a comparison image having a comparison feature 510 may further comprise instructions to receive a combined image or signals to display a combined image. The instructions to receive a combined image may comprise receiving a binary encoded signal to produce a combined image on a SLM. In some situations, the instructions may comprise instructions to combine the reference image and comparison image(s) into a single image.

Instructions for compressing the reference image and the comparison image with a substantially linear phase, symmetrical coding to generate coefficients for the images, wherein a difference between the coefficients is substantially similar to a difference between the reference feature and the comparison feature 520 may comprise instructions to compress an image to a compression ratio based upon the number and size of images to compare in a cycle of an optical correlator. In many embodiments of the invention, instructions for compressing 520 may comprise instructions to implement one or more data compression schemes or sets of compression schemes. In still further embodiments of the invention, the data compression scheme or sets of data compression schemes may be selected based upon the type or content of the images received, as well as the number of images to compare in a cycle of an optical correlator. For instance, a codebook or set of codebooks for entropy encoding may be selected based upon receipt of a fingerprint image. After a set of codebooks may be selected, a codebook may be selected based upon the number of images to compare.

Instructions for displaying the coefficients as coherent images at an input plane for optical correlation 530 may comprise instructions to display the image(s) on a SLM with a coherent light source to convert the coefficients into one or more coherent images. In several embodiments, instructions for displaying the coefficients as coherent images at an input plane for optical correlation 530 may comprise instructions to convert the coefficients and to display the converted coefficients on a binary, gray-scale, and/or color SLM, or similar display device.

What is claimed is:

1. A method, comprising:
 receiving a reference image having a reference feature and a comparison image having a comparison feature;
 compressing the reference image and the comparison image with a substantially linear phase, symmetrical coding to generate coefficients for the images, wherein a difference between the coefficients is substantially similar to a difference between the reference feature and the comparison feature; and
 displaying the coefficients as coherent images at an input plane for optical correlation.

2. The method of claim 1, further comprising combining the coefficients to display as a combined image.

3. The method of claim 1, further comprising outputting a light intensity substantially equivalent to the difference between the coefficients.

4. The method of claim 1, wherein said receiving comprises receiving images based upon track data about an object.

5. The method of claim 1, wherein said receiving comprises receiving images to describe relative positions of objects substantially simultaneously within a sensor overlap.

6. The method of claim 1, wherein said receiving comprises receiving images to describe track data sensed about an object by more than one sensor.

7. The method of claim 1, wherein said compressing comprises transforming the images with a discrete transform to determine the coefficients.

8. The method of claim 7, wherein transforming comprises decomposing the images with a biorthogonal wavelet.

9. The method of claim 1, wherein transforming comprises filtering the images with a quadrature mirror filter.

10. The method of claim 7, wherein said compressing further comprises reducing the precision of the coefficients.

11. The method of claim 7, wherein said compressing further comprises encoding bits of the coefficients.

12. The method of claim 1, wherein said displaying comprises illuminating the coefficients with coherent light.

13. The method of claim 1, wherein said displaying comprises displaying the coefficients with a spatial light modulator.

14. An apparatus, comprising:
   a image compressor to compress images comprising a reference image having a reference feature and a comparison image having a comparison feature, with a substantially linear phase, symmetrical coding to generate coefficients, wherein a difference between the coefficients is substantially similar to a difference between the reference feature and the comparison feature; and
   a display coupled with said image compressor to display the coefficients as coherent images at an input plane for optical correlation.

15. The apparatus of claim 14, wherein said image compressor comprises a linear transformer to generate the coefficients of the images with a discrete transform.

16. The apparatus of claim 15, wherein the linear transformer comprises circuitry to decompose the images with a biorthogonal wavelet.

17. The apparatus of claim 15, wherein the circuitry comprises a quadrature mirror filter.

18. The apparatus of claim 15, wherein said image compressor comprises a quantizer to reduce the precision of the coefficients.

19. The apparatus of claim 15, wherein said image compressor comprises an encoder to compress the coefficients.

20. The apparatus of claim 14 wherein said display comprises a spatial light modulator.

21. The apparatus of claim 20, wherein the spatial light modulator comprises an electrically-addressed spatial light modulator.

22. The apparatus of claim 20, wherein the spatial light modulator comprises an optically-addressed spatial light modulator.

23. The apparatus of claim 20, wherein the spatial light modulator comprises a gray-scale spatial light modulator.

24. A system, comprising:
   a image compressor to compress images, a reference image having a reference feature and a comparison image having a comparison feature, with a substantially linear phase, symmetrical coding to generate coefficients, wherein a difference between the coefficients is substantially similar to a difference between the reference feature and the comparison feature;
   a display coupled with said image compressor to display the coefficients as coherent images at an input plane for optical correlation; and
   an optical correlator coupled with said display at the input plane to output a light intensity to represent the difference between the coefficients.

25. The system of claim 24, wherein said optical correlator comprises a joint transform optical correlator.

26. The system of claim 25, wherein the joint transform optical correlator comprises a non-linear joint transform optical correlator.

27. A machine-readable medium containing instructions, which when executed by a machine, cause said machine to perform operations, comprising:
   receiving a reference image having a reference feature and a comparison image having a comparison feature;
   compressing the reference image and the comparison image with a substantially linear phase, symmetrical coding to generate coefficients for the images, wherein a difference between the coefficients is substantially similar to a difference between the reference feature and the comparison feature; and
   displaying the coefficients as coherent images at an input plane for optical correlation.

28. The machine-readable medium of claim 27, wherein said receiving comprises receiving images to describe relative positions of objects substantially simultaneously within a sensor overlap.

29. The machine-readable medium of claim 27, wherein said receiving comprises receiving images to describe track data sensed about an object by more than one sensor.

30. The machine-readable medium of claim 27, wherein said compressing comprises transforming the images with a discrete transform to determine the coefficients.

* * * * *